(12) United States Patent
Smith

(10) Patent No.: US 7,448,249 B2
(45) Date of Patent: Nov. 11, 2008

(54) CLUTCH ACTUATION CONTROL SYSTEM WITH ADJUSTABLE POSITION ENCODER ASSEMBLY

(75) Inventor: William E. Smith, Liverpool, NY (US)

(73) Assignee: Magna Powertrain USA, Inc., Troy, MI (US)

( * ) Notice: Subject to any disclaimer, the term of this patent is extended or adjusted under 35 U.S.C. 154(b) by 0 days.

(21) Appl. No.: 12/005,254

(22) Filed: Dec. 26, 2007

(65) Prior Publication Data

US 2008/0105025 A1    May 8, 2008

Related U.S. Application Data

(63) Continuation of application No. 11/006,397, filed on Dec. 7, 2004, now Pat. No. 7,313,943.

(51) Int. Cl.
*G01B 21/00* (2006.01)
(52) U.S. Cl. .................................................. 73/1.79
(58) Field of Classification Search .................. 73/1.79; 180/247; 74/335, 337.5; 340/686.1
See application file for complete search history.

(56) References Cited

U.S. PATENT DOCUMENTS

| | | | |
|---|---|---|---|
| 5,699,870 A | 12/1997 | Warren | 180/247 |
| 6,155,126 A | 12/2000 | Vogt et al. | 74/335 |
| 6,211,794 B1 | 4/2001 | DeSoto | 340/686.1 |
| 6,230,577 B1 | 5/2001 | Showalter et al. | 74/337.5 |
| 2001/0029221 A1* | 10/2001 | Oliveira et al. | 477/107 |

FOREIGN PATENT DOCUMENTS

JP            59124495 A         7/1984

* cited by examiner

*Primary Examiner*—Hezron Williams
*Assistant Examiner*—Tamiko D Bellamy
(74) *Attorney, Agent, or Firm*—Harness, Dickey & Pierce, P.L.C.

(57) ABSTRACT

An adjustable position sensor is provided suitable for use with a clutch actuation control system. The position sensor includes: a rotatable shaft adapted to engage a control gear of the clutch actuation control system; and an encoder having a position indicator adjustably coupled to the shaft and operable to detect the position of the shaft over a range of motion that is less than the range of movement exhibited by the control gear. The position indicator of the encoder is adjustable in relation to the shaft so that the range of motion detected by the encoder can be correlated to an area of interest within the range of motion exhibited by the control gear.

22 Claims, 5 Drawing Sheets

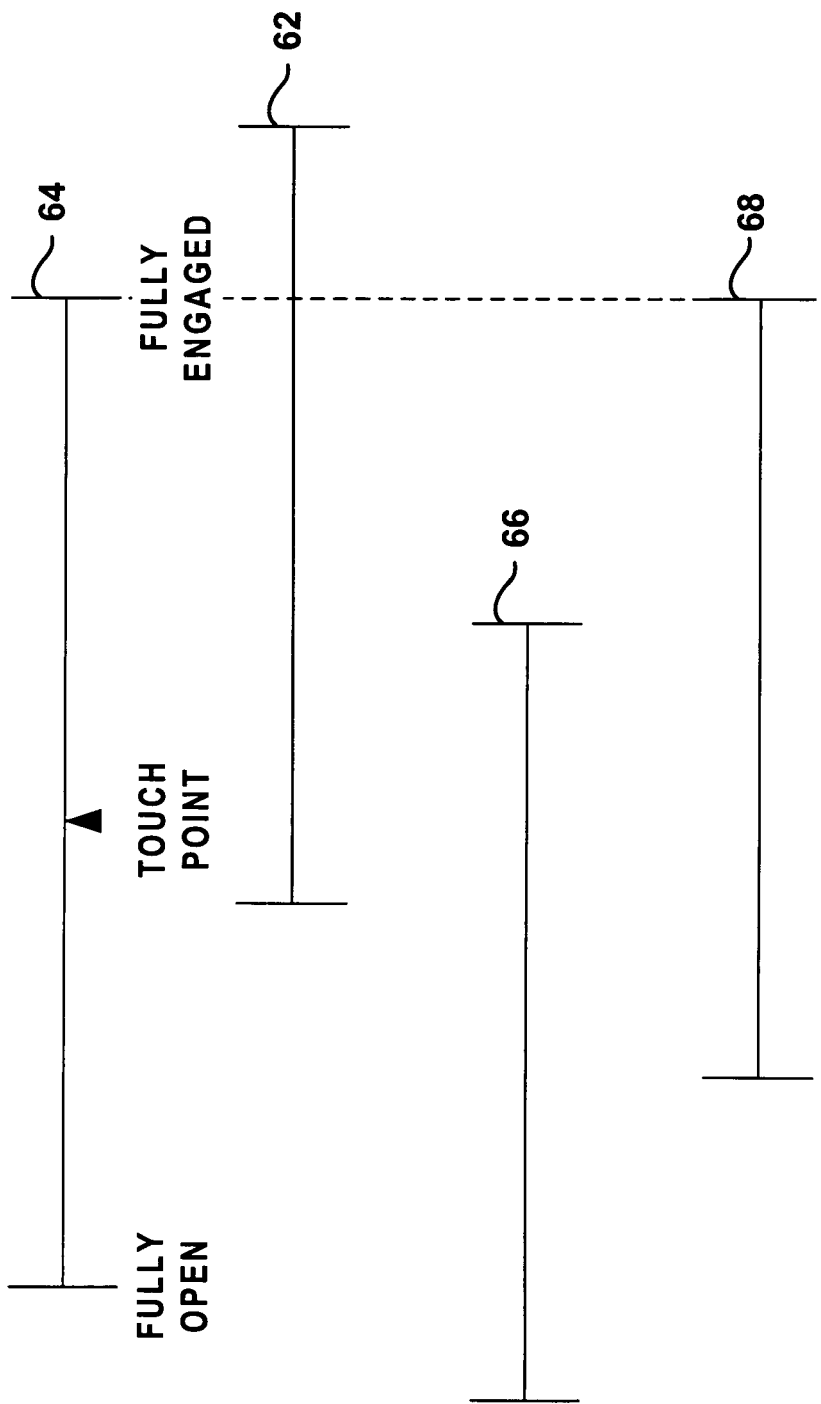

CLUTCH ACTUATION CONTROL SYSTEM WITH ADJUSTABLE POSITION ENCODER ASSEMBLY

CROSS-REFERENCE TO RELATED APPLICATIONS

This application is a continuation of U.S. patent application Ser. No. 11/006,397 filed on Dec. 7, 2004. The disclosure of the above application is incorporated herein by reference.

FIELD OF THE INVENTION

The present invention relates generally to position sensors and, more particularly, an adjustable encoder for use with a clutch actuation control system.

BACKGROUND OF THE INVENTION

In modern automotive applications, various control systems are interested in positional information for the clutch. To determine such positional information, position encoders have been used to monitor the position of a control gear of the clutch actuation system, thereby determining positional information for the clutch. However, these conventional encoders are designed to operate over the entire range of motion of the control gear. Since clutch actuation only occurs at the end of this range of motion, the full resolution of the encoder is not being utilized to monitor the area of interest within the range of motion exhibited by the control gear.

In order to increase precision of the positional information reported by the encoder, it is desirable to provide an adjustable encoder suitable for use with a clutch actuation system. Preferably, a position indicator associated with the encoder may be adjustable so that the range of motion detected by the encoder can be correlated to an area of interest within the range of motion exhibited by the control gear.

SUMMARY OF THE INVENTION

In accordance with the present invention, an adjustable position sensor is provided suitable for use with a clutch actuation control system. The position sensor includes: a rotatable shaft adapted to engage a control gear of the clutch actuation control system; and an encoder having a position indicator adjustably coupled to the shaft and operable to detect the position of the shaft over a range of motion that is less than the range of movement exhibited by the control gear. The position indicator of the encoder is adjustable in relation to the shaft so that the range of motion detected by the encoder can be correlated to an area of interest within the range of motion exhibited by the control gear.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

FIG. 6 is a diagram illustrating an exemplary method for adjusting the reporting range of the position sensor of the present invention.

DETAILED DESCRIPTION OF THE PREFERRED EMBODIMENTS

Figure 1:
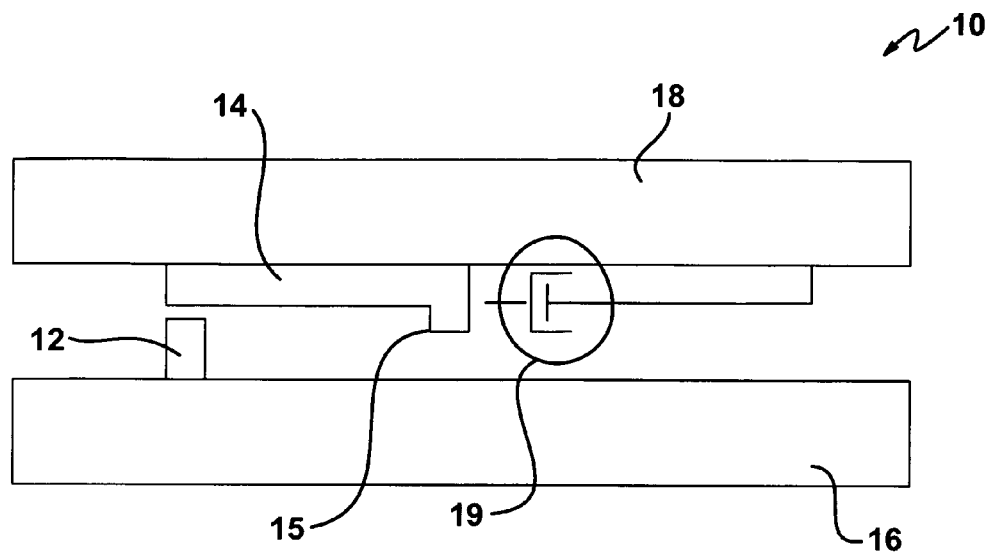
FIG. 1 is a diagram illustrating the operating principles behind an adjustable position encoder in accordance with an exemplary embodiment of the present invention.

FIG. 1 illustrates the operating principles behind an adjustable position encoder 10 in accordance with the present invention. The encoder 10 may be generally characterized as consisting of two members which move relative to each other. For discussion purposes, one of these members will be referred to as a position indicator 12 and the other member will be referred to as the position detector 14.

The position indicator 12 is rigidly fixed to a member 16 whose position is desired to be known. In operation, the position indicator 12 cooperatively operates with the position detector 14 to detect the position of the first member 16 in relation to a second member 18, where the position detector 14 is attached to the second member 18. The position detector 14 in turn generates a signal indicative of the detected position. Thus, the position of the first member 16 is reported relative to the second member 18. It is readily understood that the position indicator 12 and position detector 14 may be switched such that the position detector 14 is affixed to the member whose position is desired to be known.

Since the range of motion exhibited by the first member 16 may exceed the range of motion detected by the encoder 10, the position detector 14 is adjustably attached to a second member 18. In an exemplary embodiment, the relative motion of the position indicator 12 and the position detector 14 may be limited in one direction as shown in FIG. 1. In particular, the position detector 14 provides an end stop 15 that defines an outer boundary of the reporting range for the encoder 10. Although the movement of the position indicator 12 is not constrained in the other direction, it is readily understood that the encoder 10 only reports position data in an area where the position indicator 12 operatively engages the position detector 14. In addition, it is envisioned that the position detector 14 may include two end stops which defines the reporting range for the encoder 10.

To adjust the reporting range of the encoder 10, the position indicator 12 is driven toward the end stop provided by the position detector 14. When the position indicator 12 engages the end stop 15 on the position detector 14, the position detector 14 is moved in relation to the second member 18. When the position indicator 12 then traverses the opposite direction, a frictional drag force is employed to prevent the position detector 14 from moving relative to the second member 18. The drag force is diagrammatically represented as 19 in FIG. 1. However, it is envisioned that other techniques may be employed to restrain or otherwise prevent the movement the position detector 14 relative to the second member 18. In this way, the range of motion detected by the encoder 10 can be correlated to an area of interest within the range of motion exhibited by the first member 16.

Figure 2:
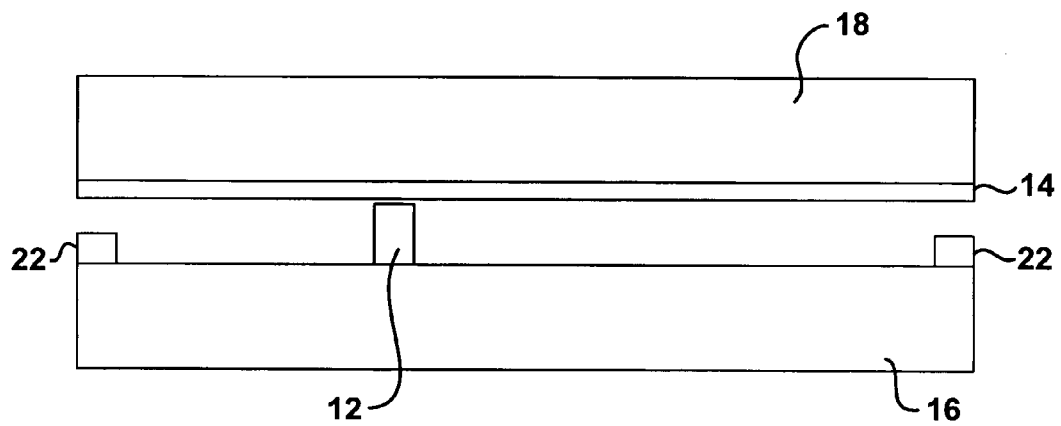
FIG. 2 is a diagram illustrating the operating principles behind an adjustable position encoder in accordance with an alternative embodiment of the present invention.

In an alternative embodiment, the position indicator 12 adjustably moves in relation to the first member 16 and the position detector 14 is rigidly fixed to the second member 18. Referring to FIG. 2, end stops 22 again define the range of motion for the position indicator 12. In this embodiment, the end stops 22 are affixed to the second member 18. In operation, a frictional force is used to maintain an engaging contact between the position indicator 12 and the first member 16, so that the position indicator 12 moves synchronously with the movement of the first member 16 under normal operating conditions.

To adjust the reporting range of the encoder, the position indicator 12 is driven toward an end stop provided by the second member 18. Upon engaging the end stop, the position indicator will move in relation to the first member if the force applied to the first member exceeds the frictional force used to maintain the engaging contact between the position indicator and the first member. In this way, the position indicator 12 may be adjustably moved in relation to the first member so that the range of motion detected by the encoder 10 can be correlated to an area of interest within the range of motion exhibited by the first member. Once correlated, the position indicator 12 will move synchronously with the movement of the first member so long as the first member is driven by a force which is less than the frictional force between the position indicator 12 and the first member.

An adjustable encoder in accordance with the present invention is particularly suitable for use with a clutch actuation control system as further described below. While the following description is provided with reference to a clutch application, it is readily understood that the broader aspects of the present invention are suitable for other uses, especially where the range of motion detected by the encoder is less than the range of motion exhibited by the member whose position is desired to be known.

Figure 3:
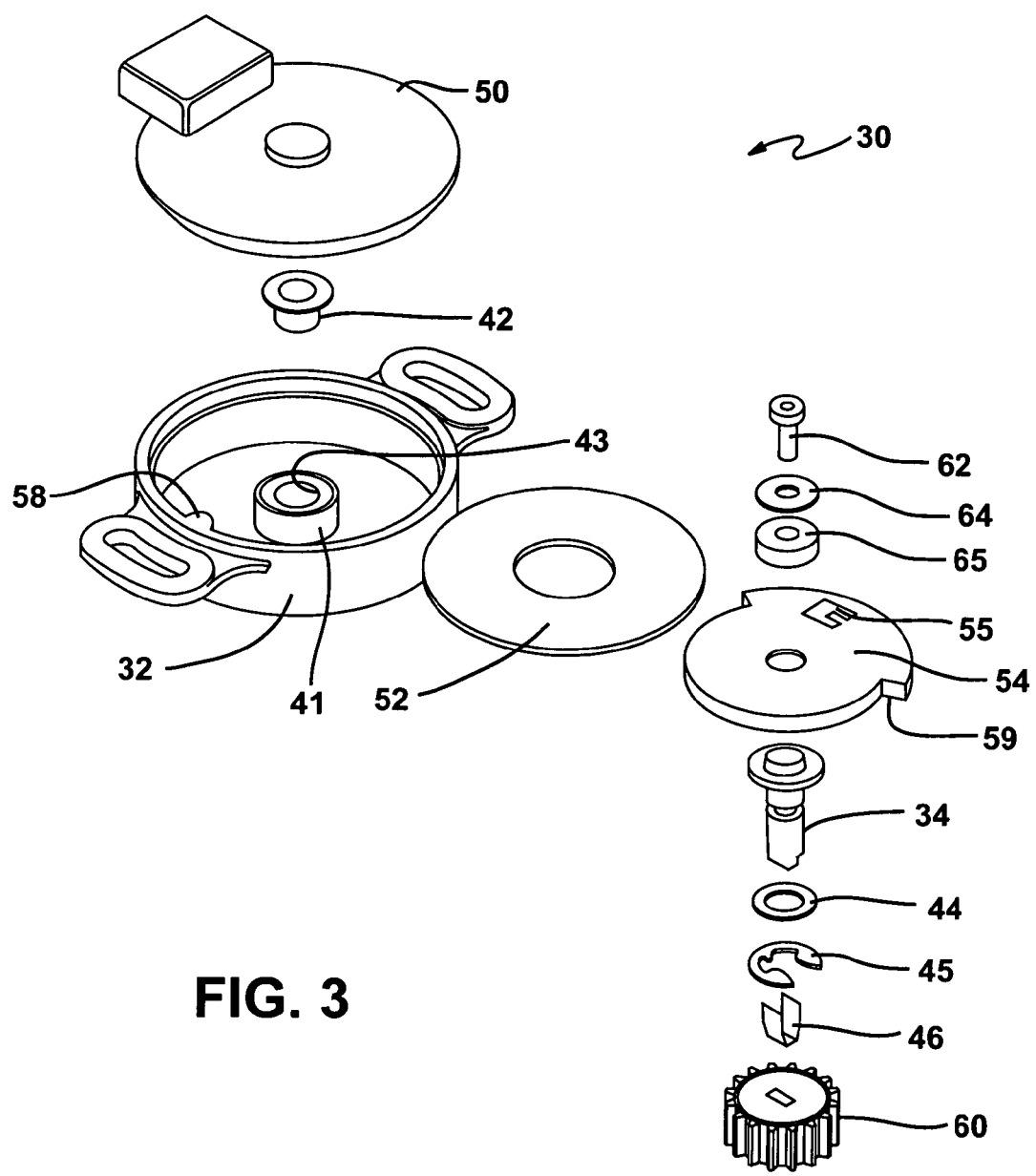
FIG. 3 is an exploded view of an exemplary position sensor in accordance with the present invention.
Figure 4:
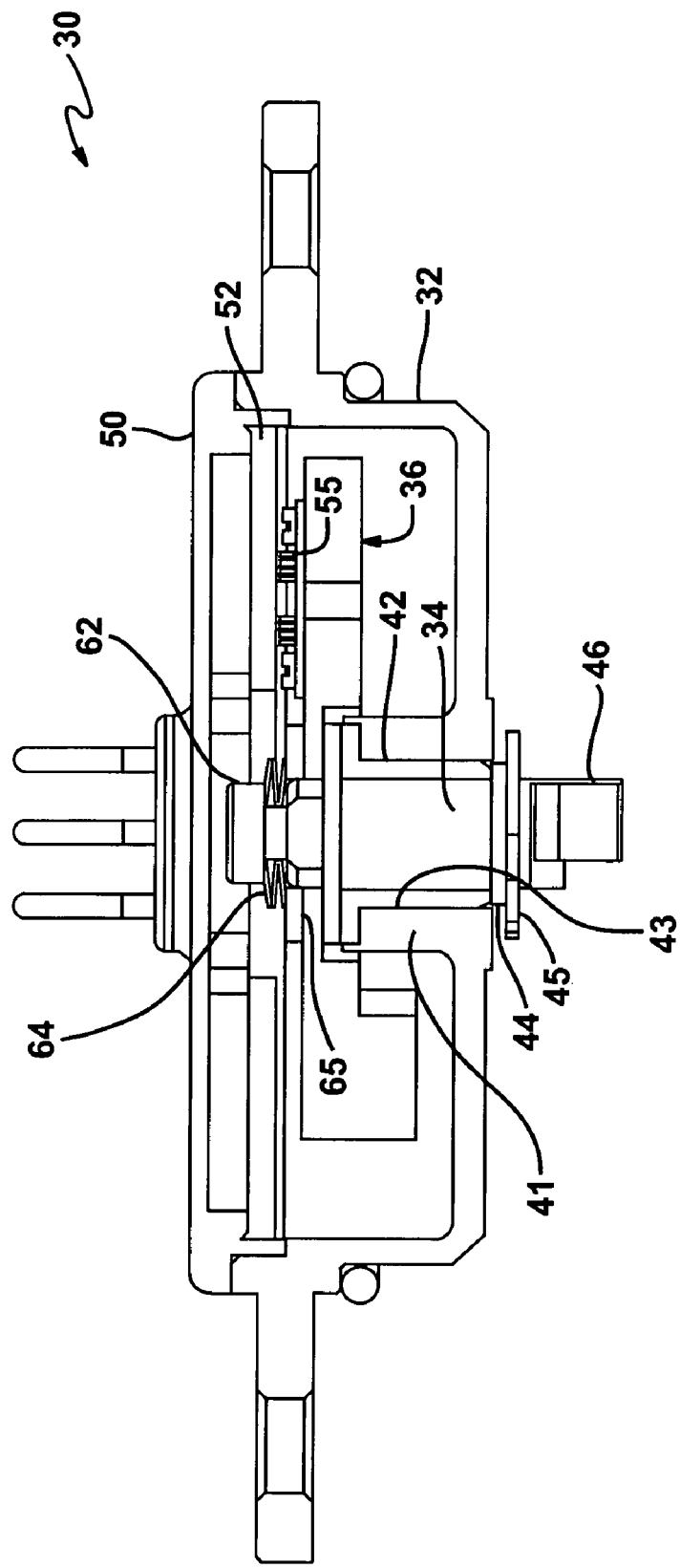
FIGS. 4 and 5 are cross-sectional side views of the exemplary position sensor.
Figure 5:
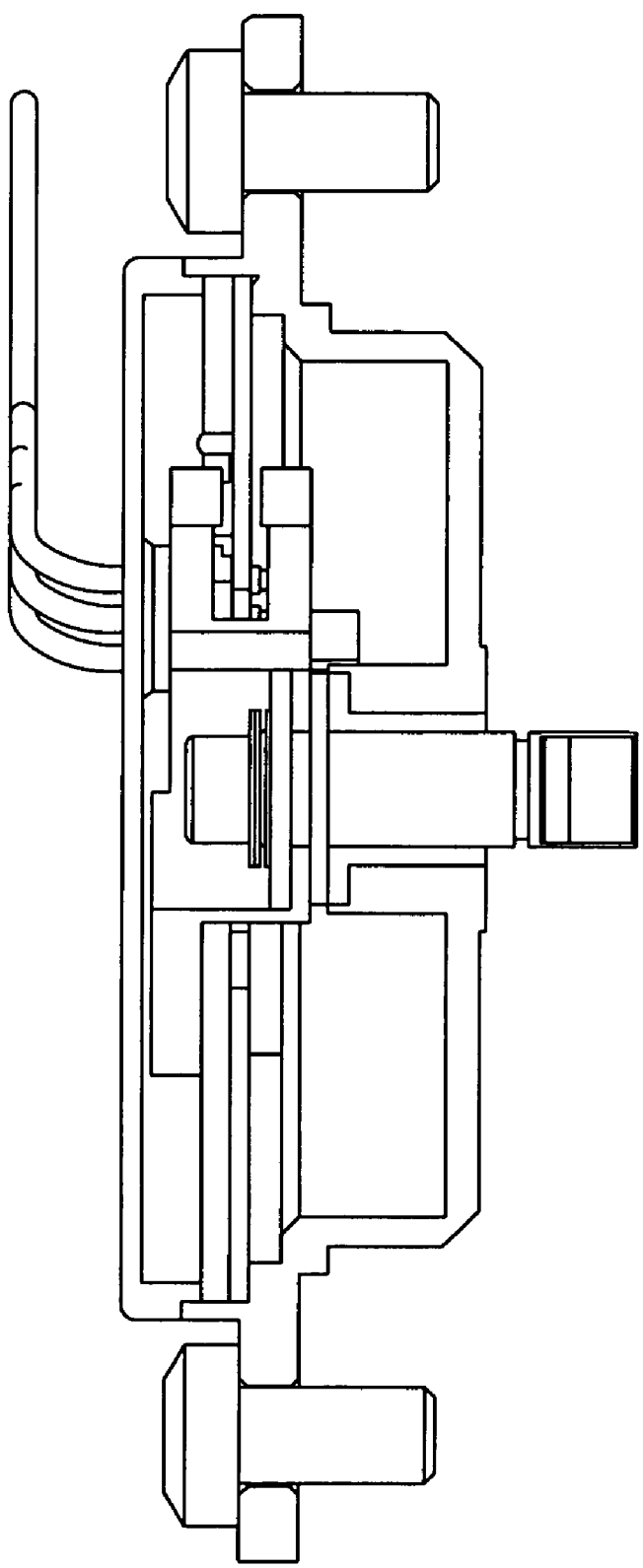

FIGS. 3-5 illustrate an exemplary position sensor in accordance with the present invention. The position sensor 30 is generally comprised of a housing 32, a rotatable shaft 34 protruding from the housing 32 and an adjustable encoder 36 for detecting the position of the shaft 34 in relation to the housing 32. In this exemplary application, the protruding end of the shaft 34 engages a control gear 60 of a clutch actuation system. Various techniques for engaging the control gear 60 are readily known by those skilled in the art. In this way, movement of the shaft 34 directly correlates to movement of the clutch which is being actuated by the control gear 60 so that the position sensor 30 provides positional information for the clutch.

The housing 32 defines a cylindrical chamber for housing the shaft 34 and the encoder 36. Formed in the bottom of the housing 32 is a collar 41 having a pass-thru hole 43 for the shaft. The shaft 34 is inserted into the hole 43 such that one end protrudes outwardly from the bottom of the housing 32. The shaft 34 is in turn held in place by a washer 44 and lock washer 45 coupled to the protruding shaft 34 adjacent the underside of the housing 32. A bearing 42 inserted into the collar 41 facilitates rotation of the shaft 34. To eliminate backlash, a spring 46 may also be coupled to the end of the shaft 34 which engages the control gear 60.

An encoder 36 operable to detect the position of the shaft 34 is also contained within the housing 32. In an exemplary embodiment, the encoder 36 is further defined as a potentiometer which is primarily comprised of a resistor element 52 and a carrier plate 54. Although a potentiometer is presently preferred, it is readily understood that other types of encoders may be employed within the scope of the present invention.

To detect shaft position, the carrier plate 54 is adjustably coupled to the shaft 34. The carrier plate 54 is in the form of a plate. A screw 62 passing through a spring washer 64, a nylon washer 65, and a center hole in the carrier plate 54 couples the carrier plate 54 to the shaft 34 by threading into a mating hole formed in the top of the shaft 34. In this exemplary embodiment, the spring washer 64 acts to bias the carrier plate 54 into engaging contact with the top of the shaft 34 such that the carrier plate 54 synchronously rotates with the shaft 34. However, it is envisioned that other types of connection techniques may be employed to couple the carrier plate 54 to the shaft 34.

The resistor element 52 is likewise in the form of a plate which is affixed to a cap 50 for the housing 32. When the cap 50 is placed over the chamber formed by the housing 32, the resistor element 52 is placed in engaging relation with the carrier plate 54. In particular, the carrier plate 54 includes a sliding contact 55 which engages the surface of the resistor element 52. As the shaft 34 rotates, the contact 55 slides along the resistor element 52, thereby changing the output signal generated by the potentiometer as is well known in the art. In this way, the output signal from the potentiometer indicates a position of the shaft 34 in relation the housing 32.

Within a defined range of motion, the carrier plate 54 moves synchronously with the rotation of the shaft 34. This range of motion is defined by end stops 58 formed along the inner wall of the housing chamber. As the carrier plate 54 rotates within the housing 32, a stepped area 59 formed along the circumferential edge of the circular carrier plate 54 contacts protruding surfaces 58 along the inner wall of the housing 32. Thus, these protruding surfaces 58 provide end stops which limit the rotational movement of the carrier plate 54 as well as define the reporting range of the encoder.

To adjust the reporting range of the encoder, the carrier plate 54 is driven towards an end stop 58. Upon contacting the end stop, the movement of the carrier plate 54 is halted. However, if the torque being applied to the shaft 34 exceeds the biasing force applied by the spring washer 64, then the shaft 34 will continue to rotate in relation to a stationary carrier plate 54. In this way, the range of motion detected by the encoder 36 can be aligned to an area of interest within the range of motion exhibited by the shaft.

A method for adjusting the range of the exemplary position sensor 36 is further described below. In an conventional approach, the reporting range of the encoder 36 is fixed in relation to the range of motion exhibited by the clutch. In a clutch application, points of interest include the point at which the clutch first engages (commonly referred to as the touch point) and the point at which the clutch is fully engaged (referred to herein as the fully engaged position). The reporting range of the encoder must encompass these two points of interest.

For illustration purposes, the reporting range of the encoder 36 is shown at 62 in fixed relation to the range of motion of the clutch as shown at 64 in FIG. 6. The reporting range of the encoder encompasses both the touch point and the fully engaged position. However, it is also noteworthy that the reporting range of the encoder also extends beyond the range of motion of the clutch. Thus, the full resolution of the encoder is not utilized to monitor the movement of the clutch.

In contrast, the reporting range of the adjustable encoder of the present invention may be aligned with the area of interest within the range of motion traversed by the clutch. To do so, the clutch is first actuated to its fully open position. During this initialization process, the control gear applies a torque to the shaft which exceeds the biasing force applied by the spring washer of the encoder. As a result, the shaft will continue to rotate in relation to carrier plate once the carrier plate contacts the end stop. Upon reaching its fully open position, the reporting range of the encoder will align the range of clutch motion as shown at 66 in FIG. 6.

The clutch is then actuated to its fully engaged position. Again, the control gear 60 transfers a torque to the shaft 34 which exceeds the biasing force applied by the spring washer 64 of the encoder. When the carrier plate 54 rotates in the opposite direction and contacts the other end stop, the shaft likewise continues to rotate in relation to the carrier plate. When the clutch reaches the fully engaged position, the reporting range of the encoder aligns with the range of clutch motion as shown at 68 of FIG. 6. In this way, the full resolution of the encoder is utilized to monitor the entire area of interest within the range of motion exhibited by the control gear.

This method for adjusting the range of the position sensor is preferably executed when the clutch assembly is first assembled. However, it is also envisioned that it may be executed initiated upon the occurrence of certain defined triggers or periodically thereafter.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A position sensor for use with a clutch actuation control system, comprising:
    a first member;
    a second member supported for rotation relative to said first member and driven by a rotary element of the clutch actuation control system;
    a position detector secured to said first member; and
    a position indicator biased by a biasing member into engagement for rotation with said second member, said position indicator operable to detect the angular position of said second member relative to said first member to permit said position detector to generate a position signal indicative of the detected position, wherein said biasing force of said biasing member causes said position indicator to rotate synchronously with said second member until an engagement portion of said position indicator engages a stop portion of said first member.

2. The position sensor of claim 1 wherein said second member continues to rotate relative to said first member and said position indicator after engagement of said engagement portion of said position indicator with said stop portion of said first member.

3. The position sensor of claim 1 wherein said second member is a shaft and said position indicator is a rotatable plate, and wherein said biasing member biases said rotatable plate into engagement with said shaft so as to cause concurrent rotation of said rotatable plate with said shaft.

4. The position sensor of claim 3 wherein a connector passes through said biasing member and an aperture in said rotatable plate and is secured in an aperture formed in an end of said shaft, said connector is operable to deflect said biasing member for generating said biasing force that is exerted by said biasing member on said rotatable plate and said shaft.

5. The position sensor of claim 3 wherein said engagement portion of said rotatable plate defines an end surface engageable with an end stop formed on said first member to limit rotation of said rotatable plate relative to said first member in response to continued rotation of said shaft.

6. The position sensor of claim 1 wherein said first member is a housing and said second member is a shaft supported for rotation relative to said housing, and wherein said position indicator is a rotatable plate concentrically aligned with said shaft and operably connected thereto by a connector.

7. The position sensor of claim 6 wherein said biasing member is further defined as a spring washer interposed between said connector and said rotatable plate and configured to bias said rotatable plate into engagement with an end of said shaft.

8. The position sensor of claim 6 wherein the position detector is further defined as a potentiometer having a resistor element in fixed relation to said housing and said position indicator provides a slide contact in engaging relation with said resistor element, thereby indicating a position of said shaft in relation to said housing.

9. The position sensor of claim 6 wherein said position detector detects the position of said shaft over a range of motion that is less than the range of movement exhibited by the rotary element of the clutch actuation control system and is adjustable in relation to said shaft so that the range of motion detected can be correlated to an area of interest within the range of motion exhibited by the rotary element.

10. The position sensor of claim 9 wherein an outer boundary for the range of motion detected aligns with a fully closed position of a clutch actuated by the clutch actuation control system.

11. A position sensor for use with a clutch actuation control system, comprising:
    a housing;
    a rotatable shaft rotatably supported by said housing and adapted to be driven by a rotary element of the clutch actuation control system;
    a position detector secured to said housing;
    a position indicator operable with said position detector to detect the position of said shaft in relation to said housing through a first range of travel and generate a signal indicative of the detected position; and
    a biasing member operable for resiliently coupling said position indicator for rotation with said shaft through said first range of travel, wherein said position indicator is prevented from rotating with said shaft through a second range of travel when a rotation limiting mechanism disposed between said position indicator and said housing overcomes the bias force provided by said biasing member between said position indicator and said shaft.

12. The position sensor of claim 11 wherein said position indicator is a rotatable plate, and wherein said biasing member is further defined as a spring washer interposed between a connector and said rotatable plate and configured to bias said rotatable plate into engagement with an end of said shaft.

13. The position sensor of claim 11 further defined as a potentiometer having a resistor element in fixed relation to said housing and said position indicator provides a slide contact in engaging relation with said resistor element, thereby indicating a position of said shaft in relation to said housing.

14. The position sensor of claim 11 wherein said position detector detects the position of said shaft over said first range of travel that is less than the range of movement exhibited by the rotary element and adjustable in relation to said shaft so that said first range of travel detected can be correlated to an area of interest within the range of motion exhibited by the rotary element.

15. The adjustable position sensor of claim 14 wherein an outer boundary for said first range of travel detected aligns with a fully closed position of a clutch actuated by the clutch actuation control system.

16. A position sensor for use with a clutch actuation control system, comprising:
    a housing;
    a shaft supported for rotation by said housing and driven by a rotary element of the clutch actuation control system;
    a position detector non-rotatably secured to the housing;
    a position indicator cooperatively operable with said position detector to detect the relative position of said shaft in relation to said housing and generate a signal indicative of the detected position; and a biasing member that biases said position indicator into engaging contact with said shaft, wherein said position indicator rotates with said shaft when torque applied to said shaft is less than the bias force between said position indicator and said shaft, and wherein said position indicator is prevented from rotating with said shaft when a rotation limiting mechanism causes the torque applied to said shaft to overcome the biasing force between said position indicator and said shaft.

17. The position sensor of claim 16 wherein the position detector detects the position of said shaft over a range of motion that is less than the range of movement exhibited by the rotary element and adjustable in relation to said shaft so that the range of motion detected can be correlated to an area of interest within the range of motion exhibited by the rotary element, such that an outer boundary for the range of motion detected aligns with a fully closed position of a clutch actuated by the clutch actuation control system.

18. The position sensor of claim 16 wherein said position indicator synchronously rotates with said shaft when torque applied to said shaft is less than the bias force between said position indicator and said shaft.

19. The position sensor of claim 16 wherein said position indicator is a rotatable plate concentrically aligned with said shaft and operably coupled thereto by a connector.

20. The position sensor of claim 19 wherein said biasing member is further defined as a spring washer interposed between said connector and said rotatable plate and configured to bias said rotatable plate into engagement with an end of said shaft.

21. The position sensor of claim 16 wherein the position detector is further defined as a potentiometer having a resistor element in fixed relation to said housing and said position indicator provides a slide contact in engaging relation with said resistor element, thereby indicating a position of said shaft in relation to said housing.

22. The position sensor of claim 16 wherein said rotation limiting mechanism includes a first stop surface formed on said position indicator that is engageable with a second stop surface formed on said housing.

* * * * *